(12) United States Patent
Song et al.

(10) Patent No.: US 10,901,640 B2
(45) Date of Patent: Jan. 26, 2021

(54) MEMORY ACCESS SYSTEM AND METHOD

(71) Applicant: HUAWEI TECHNOLOGIES CO., LTD., Guangdong (CN)

(72) Inventors: Fenglong Song, Beijing (CN); Guangfei Zhang, Shenzhen (CN); Tao Wang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 307 days.

(21) Appl. No.: 15/827,746

(22) Filed: Nov. 30, 2017

(65) Prior Publication Data

US 2018/0121126 A1     May 3, 2018

Related U.S. Application Data

(63) Continuation of application No. PCT/CN2015/080609, filed on Jun. 2, 2015.

(51) Int. Cl.
   *G06F 3/06*        (2006.01)
   *G06F 12/08*      (2016.01)
   (Continued)

(52) U.S. Cl.
   CPC .......... *G06F 3/0641* (2013.01); *G06F 3/0608* (2013.01); *G06F 3/0659* (2013.01);
   (Continued)

(58) Field of Classification Search
   CPC .. G06F 3/0641; G06F 12/0895; G06F 12/084; G06F 12/08; G06F 12/1045;
   (Continued)

(56) References Cited

U.S. PATENT DOCUMENTS

5,813,031 A *   9/1998   Chou ................. G06F 12/0897
                                                                                  711/122
6,493,800 B1    12/2002   Blumrich
                          (Continued)

FOREIGN PATENT DOCUMENTS

CN          1763730 A     4/2006
CN       101523359 A     9/2009
           (Continued)

OTHER PUBLICATIONS

Michael D. Powell et al. Reducing Set-Associative Cache Energy via Way-Prediction and Selective Direct-Mapping. IEEE 2001. pp. 54-65.

(Continued)

*Primary Examiner* — William B Partridge
*Assistant Examiner* — Alan Otto
(74) *Attorney, Agent, or Firm* — Fish & Richardson P.C.

(57) ABSTRACT

A memory access system includes a memory, a controller, and a redundancy elimination unit. The memory is a multi-way set associative memory, and the redundancy elimination unit records M record items. Each record item is used to store a tag of a stored data block in one of storage sets. The controller determines a read data block and a target storage set of the read data block and sends a query message to the redundancy elimination unit. The query message carries a set identifier of the target storage set of the read data block and a tag of the read data block. The redundancy elimination unit determines a record item corresponding to the set identifier of the target storage set, matches the tag of the read data block with a tag of a stored data block in the record item corresponding to the target storage set of the read data block.

19 Claims, 6 Drawing Sheets

(51) Int. Cl.
*G06F 12/084* (2016.01)
*G06F 12/0895* (2016.01)
*G06F 12/1045* (2016.01)

(52) U.S. Cl.
CPC ............ *G06F 3/0673* (2013.01); *G06F 12/08* (2013.01); *G06F 12/084* (2013.01); *G06F 12/0895* (2013.01); *G06F 12/1045* (2013.01); *G06F 2212/1044* (2013.01); *Y02D 10/00* (2018.01)

(58) Field of Classification Search
CPC .... G06F 3/0673; G06F 3/0659; G06F 3/0608; G06F 2212/1044; Y02D 10/13
See application file for complete search history.

(56) References Cited

U.S. PATENT DOCUMENTS

| | | | |
|---|---|---|---|
| 6,845,432 | B2 | 1/2005 | Maiyuran et al. |
| 7,475,192 | B2 | 1/2009 | Correale, Jr. et al. |
| 7,689,772 | B2 | 3/2010 | Damaraju et al. |
| 8,631,207 | B2 | 1/2014 | Fang et al. |
| 2003/0030643 | A1 | 2/2003 | Taylor et al. |
| 2005/0160228 | A1 | 7/2005 | Teruyama |
| 2006/0090034 | A1 | 4/2006 | Ishihara et al. |
| 2006/0095680 | A1 | 5/2006 | Park et al. |
| 2008/0046653 | A1 | 2/2008 | Knoth et al. |
| 2011/0010503 | A1* | 1/2011 | Yamamura ............ G06F 12/121 711/128 |
| 2012/0246408 | A1 | 9/2012 | Yamamura et al. |
| 2013/0219205 | A1 | 8/2013 | Licht et al. |
| 2014/0006797 | A1 | 1/2014 | Cordella et al. |
| 2014/0337605 | A1 | 11/2014 | Hall et al. |
| 2014/0344522 | A1 | 11/2014 | Fan et al. |
| 2016/0299700 | A1* | 10/2016 | Day ...................... G06F 3/0611 |

FOREIGN PATENT DOCUMENTS

| | | |
|---|---|---|
| CN | 101727311 A | 6/2010 |
| CN | 102662868 A | 9/2012 |

OTHER PUBLICATIONS

International Search Report and Written Opinion in International Application No. PCT/CN2015/080609, dated Mar. 2, 2016, 20 pages.
"Chapter 2:Logical Organisation" In:Bruce Jacob, Spencer W.Ng, David T. Wang:"Memory Systems:Cache, DRAM, Disk", Jul. 28, 2010, Elsevier ScienceandTechnology, XP002780638, 38 pages.
Extended European Search Report issued in European Application No. 15893701.1 dated May 22, 2018, 7 pages.
Office Action issued in Chinese Application No. 201580080676.9 dated Apr. 3, 2020, 7 pages (with English translation).
EPO Communication pursuant to Article 94(3) EPC issued in European Application No. 15893701.1 dated Jan. 15, 2020, 6 pages.
Zia et al., "A 3-D Cache With Ultra-Wide Data Bus for 3-D Processor-Memory Integration," IEEE Transactions on Very Large Scale Integration (VLSI) Systems, vol. 18, No. 6, IEEE Service Center, Piscataway, NJ, USA, XP011295423, Jun. 2010, pp. 967-977.

* cited by examiner

|        | Record Bit 1 | Record Bit 2 | Record Bit 3 | ... | Record Bit N-1 |
|--------|--------------|--------------|--------------|-----|----------------|
| Item 0 | Label 1 | Label 2 | Label 3 | ... | Label N-1 |
| Item 1 | Label 1 | Label 2 | Label 3 | ... | Label N-1 |
| Item 2 | Label 1 | Label 2 | Label 3 | ... | Label N-1 |
| Item 3 | Label 1 | Label 2 | Label 3 | ... | Label N-1 |
| ... | | | | | |
| Item M-1 | Label 1 | Label 2 | Label 3 | ... | Label N-1 |

MEMORY ACCESS SYSTEM AND METHOD

CROSS-REFERENCE TO RELATED APPLICATIONS

This application is a continuation of International Application No. PCT/CN2015/080609, filed on Jun. 2, 2015, the disclosure of which is hereby incorporated by reference in its entirety.

TECHNICAL FIELD

The present application relates to the field of memory technologies, and in particular, to a memory access system and method.

BACKGROUND

An on-chip cache is a necessary component of multiple types of existing processors such as a single-core processor, a multi-core processor, and a many-core processor. An existing cache structure commonly uses a way set associative structure. However, during access to a way set associative cache, all cache ways (N ways) in the cache need to be enabled, parallel comparison is performed between a tag fetched from a fetch access and all tags in a cache line corresponding to the fetch address, and a comparison result indicating whether the tag fetched from the fetch address is the same as a tag in the cache line is obtained. In each parallel comparison, the tag fetched from the fetch address is the same as a maximum of one tag in the cache line. This is referred to as a cache hit. That is, even in the case of a hit, at least N−1 times of redundant access may be caused. If the tag fetched from the fetch address is different from all tags in the cache line, a cache miss occurs, that is, at least N times of redundant access is caused.

In a multi-core processor such as an SMT processor, when multiple hardware threads share a cache, a probability that cache blocks in a same cache line belong to a same thread is reduced. That is, when one thread needs to access a cache block that is already occupied by another thread, all storage ways need to be enabled. A cache miss can be determined only after N times of tag comparison, and then data in the cache block is replaced with data that needs to be accessed in a memory. Therefore, a proportion of mutual replacement of cache blocks occupied by different threads increases, and a problem of redundant cache access becomes more severe.

SUMMARY

Embodiments of the present application provide a memory access system and method, to effectively reduce redundant access, and improve access performance of a memory.

A first aspect of the embodiments of the present application provides a memory access system, including: a memory, a controller, and a redundancy elimination unit, where the memory includes M×N storage blocks, where each row of the storage blocks forms a storage set, each column of the storage blocks forms a storage way, each storage set is provided with a set identifier, and M or N is a positive integer greater than or equal to 2;

the redundancy elimination unit is configured to record M record items, where each record item corresponds to one of the storage sets, and each record item is used to store a tag of a stored data block in one of the storage sets;

the controller is configured to receive a data read request, determine a read data block and a target storage set of the read data block, and send a query message to the redundancy elimination unit, where the query message carries a set identifier of the target storage set of the read data block and a tag of the read data block; and the redundancy elimination unit is configured to: determine, according to the set identifier of the target storage set of the read data block, a record item corresponding to the set identifier of the target storage set; and match the tag of the read data block with a tag of a stored data block in the record item corresponding to the target storage set of the read data block, and if no match is found, send, to the controller, a query response message indicating that read data is not hit.

With reference to the first aspect, in a first possible implementation, the controller is further configured to receive a data write request, determine a target storage set of a write data block and a tag of the write data block, store the write data block to a target storage block in the target storage set, and send a set identifier of the target storage set of the write data block and the tag of the write data block to the redundancy elimination unit; and the redundancy elimination unit is further configured to: record, according to the set identifier of the target storage set of the write data block, the tag of the write data block into a record item corresponding to the set identifier of the target storage set of the write data block.

With reference to the first aspect or the first possible implementation of the first aspect, in a second possible implementation, each record item in the redundancy elimination unit includes N record bits, and each record bit corresponds to one storage block in one of the storage sets; and the redundancy elimination unit records the tag of the stored data block into a corresponding record bit in a record item corresponding to a storage set to which the stored data block belongs.

With reference to the second possible implementation of the first aspect, in a third possible implementation, the redundancy elimination unit is further configured to: when the tag of the read data block matches the tag of the stored data block in the record item corresponding to the target storage set of the read data block, determine a storage way to which a storage block corresponding to a matched record bit belongs, and send information about the determined storage way to the controller; and the controller enables, according to the information about the storage way, the storage way corresponding to the information about the determined storage way.

With reference to the first aspect or any one of the foregoing possible implementations of the first aspect, in a fourth possible implementation, the tag of the data block includes a thread identifier corresponding to the data block, or identification information of the data block, or a combination of a thread identifier corresponding to the data block and an identifier of the data block.

With reference to the first aspect or any one of the foregoing possible implementations of the first aspect, in a fifth possible implementation, when the tag of the data block includes a thread identifier corresponding to the data block and identification information of the data block, the redundancy elimination unit is specifically configured to: after receiving the query message, compare, according to the set identifier of the target storage set of the read data block, a thread identifier of the read data block with thread information of the stored data block in the record item corresponding to the target storage set of the read data block; and if the thread identifier of the read data block matches the thread information of the stored data block in the record item corresponding to the target storage set of the read data block, match identification information of the read data block with a data block identifier of a matched and stored data block in the record item corresponding to the target storage set of the read data block; or if the thread identifier of the read data block does not match the thread information of the stored data block in the record item corresponding to the target storage set of the read data block, send, to the controller, a query response message indicating that read data is not hit.

A second aspect of the embodiments of the present application provides a memory access system, including: a memory, a controller, and a redundancy elimination unit, where the memory includes M×N storage blocks, where each row of the storage blocks forms a storage set, each column of the storage blocks forms a storage way, each storage set is provided with a set identifier, and M or N is a positive integer greater than or equal to 2;

the redundancy elimination unit is configured to record M record items, where each record item corresponds to one of the storage sets, and each record item is used to store a tag of a stored data block in one of the storage sets; and the controller is configured to: receive a data read request, determine a read data block and a target storage set of the read data block, and match, according to a set identifier of the target storage set of the read data block, a tag of the read data block with a tag of a stored data block in a record item corresponding to the target storage set of the read data block, and if no match is found, return information indicating that the read data block is not hit.

With reference to the second aspect, in a first possible implementation, the controller is further configured to: receive a data write request, determine a write data block and a target storage set of the write data block, store the write data block to a target storage block in the target storage set, and record, according to a set identifier of the target storage set of the write data block, a tag of the write data block into a record item corresponding to the set identifier of the target storage set of the write data block.

With reference to the second aspect or the first possible implementation of the second aspect, in a second possible implementation, each record item in the redundancy elimination unit includes N record bits, and each record bit corresponds to one storage block in one of the storage sets; and the controller records a tag of the stored data block into a corresponding record bit in a record item corresponding to a storage set to which the stored data block belongs.

With reference to the second possible implementation of the second aspect, in a third possible implementation, the controller is further configured to: when the tag of the read data block matches the tag of the stored data block in the record item corresponding to the target storage set of the read data block, determine a storage way to which a storage block corresponding to a matched record bit belongs, and enable the storage way corresponding to information about the storage way.

With reference to the second aspect or any one of the foregoing possible implementations of the second aspect, in a fourth possible implementation, the tag of the data block includes a thread identifier corresponding to the data block, or identification information of the data block, or a combination of a thread identifier corresponding to the data block and an identifier of the data block.

With reference to the third or the fourth possible implementation of the second aspect, in a fifth possible implementation, when the tag of the data block includes a thread identifier corresponding to the data block and identification information of the data block, the controller compares, according to the set identifier of the target storage set of the read data block, a thread identifier of the read data block with thread information of the stored data block in the record item corresponding to the target storage set of the read data block; and if no match is found, returns information indicating that the read data block is not hit; or if a match is found, matches identification information of the read data block with a data block identifier of a matched and stored data block in the record item corresponding to the target storage set, and if no match is found, returns information indicating that the read data block is not hit.

A third aspect of the embodiments of the present application provides a memory access method, applied to a memory access system, where the access system includes a memory and a redundancy elimination unit; the memory includes M×N storage blocks, each row of the storage blocks forms a storage set, each column of the storage blocks forms a storage way, each storage set is provided with a set identifier, and M or N is a positive integer greater than or equal to 2; the redundancy elimination unit records M record items, each record item corresponds to one of the storage sets, and each record item is used to store a tag of a stored data block in one of storage sets; and the method includes:

receiving a data read request, and determining a read data block and a target storage set of the read data block; and matching, according to a set identifier of the target storage set of the read data block, a tag of the read data block with a tag of a stored data block in a record item that is in the redundancy elimination unit and corresponds to the target storage set of the read data block, and if no match is found, returning information indicating that the read data block is not hit.

With reference to the third aspect, in a first possible implementation, the method includes:

receiving a data write request, and determining a write data block and a target storage set of the write data block;

storing the write data block to a target storage block in the target storage set; and recording, according to a set identifier of the target storage set of the write data block, a tag of the write data block into a record item corresponding to the set identifier of the target storage set of the write data block.

With reference to the third aspect or the first possible implementation of the third aspect, in a second possible implementation, each record item in the redundancy elimination unit includes N record bits, and each record bit corresponds to one storage block in one of the storage sets; and the method further includes: recording a tag of the stored data block into a corresponding record bit in a record item corresponding to a storage set to which the stored data block belongs.

With reference to the second possible implementation of the third aspect, in a third possible implementation, the method further includes: when the tag of the read data block matches the tag of the stored data block in the record item corresponding to the target storage set of the read data block, determining a storage way to which a storage block corresponding to a matched record bit belongs, and enabling the storage way corresponding to information about the storage way.

With reference to the third aspect or any one of the foregoing possible implementations of the third aspect, in a fourth possible implementation, the tag of the data block includes a thread identifier corresponding to the data block, or identification information of the data block, or a combination of a thread identifier corresponding to the data block and an identifier of the data block.

With reference to the third aspect or any one of the foregoing possible implementations of the third aspect, in a fifth possible implementation, when the tag of the data block includes a thread identifier corresponding to the data block and identification information of the data block, after a query message is received, the redundancy elimination unit is specifically configured to: compare, according to the set identifier of the target storage set of the read data block, a thread identifier of the read data block with thread information of the stored data block in the record item corresponding to the target storage set of the read data block; and if the thread identifier of the read data block matches the thread information of the stored data block in the record item corresponding to the target storage set of the read data block, match identification information of the read data block with a data block identifier of a matched and stored data block in the record item corresponding to the target storage set; or if the thread identifier of the read data block does not match the thread information of the stored data block in the record item corresponding to the target storage set of the read data block, return information indicating that the read data block is not hit.

A fourth aspect of the embodiments of the present application provides a computer device, including: a processor, a first memory, a bus, a communications interface, and a second memory, where the second memory includes M×N storage blocks, each row of the storage blocks forms a storage set, each column of the storage blocks forms a storage way, each storage set is provided with a set identifier, and M or N is a positive integer greater than or equal to 2;

the first memory is configured to store a computer-executable instruction; the processor is connected to the first memory by using the bus; and when the computing device runs, the processor executes the computer-executable instruction stored in the first memory, so that the computer device performs the following method:

receiving a data read request, and determining a read data block and a target storage set of the read data block; and matching, according to a set identifier of the target storage set of the read data block, a tag of the read data block with a tag of a stored data block in a record item that is in a redundancy elimination unit and corresponds to the target storage set of the read data block, and if no match is found, returning information indicating that the read data block is not hit.

A fifth aspect of the embodiments of the present application provides a computer readable medium, including a computer-executable instruction, where when a processor of a computer executes the computer-executable instruction, the computer performs the following method:

receiving a data read request, and determining a read data block and a target storage set, to which the read data block belongs, of a memory, where the memory includes M×N storage blocks, M rows of the storage blocks form M storage sets, N columns of the storage blocks form N storage ways, each storage set is provided with a set identifier, and M or N is a positive integer greater than or equal to 2;

querying a redundancy elimination unit according to a set identifier of the target storage set of the read data block, where the redundancy elimination unit records M record items, each record item corresponds to one of the storage sets, and each record item is used to store a tag of a stored data block in one of the storage sets;

matching a tag of the read data block with a tag of a stored data block in a record item that is in the redundancy elimination unit and corresponds to the target storage set of the read data block; and if no match is found, returning information indicating that the read data block is not hit.

The embodiments of the present application provide a redundancy elimination unit. The redundancy elimination unit records a tag of each data block of each storage set in a multi-way set associative memory. When there is a data read request, a tag of a read data block included in the data read request is compared with a tag, recorded in the redundancy elimination unit, of each data block in a target storage set. If no match is found, it indicates that the target storage set requested for the current access does not have a data block that needs to be accessed. In this way, not all storage ways of the multi-way set associative memory need to be enabled for comparison on data block tags. Therefore, redundant access is effectively reduced, and access performance of the memory is improved. Moreover, electric energy consumption caused by the redundant access is reduced.

BRIEF DESCRIPTION OF DRAWINGS

To describe the technical solutions in the embodiments of the present application more clearly, the following briefly describes the accompanying drawings required for describing the embodiments or the prior art. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

Figure 1:
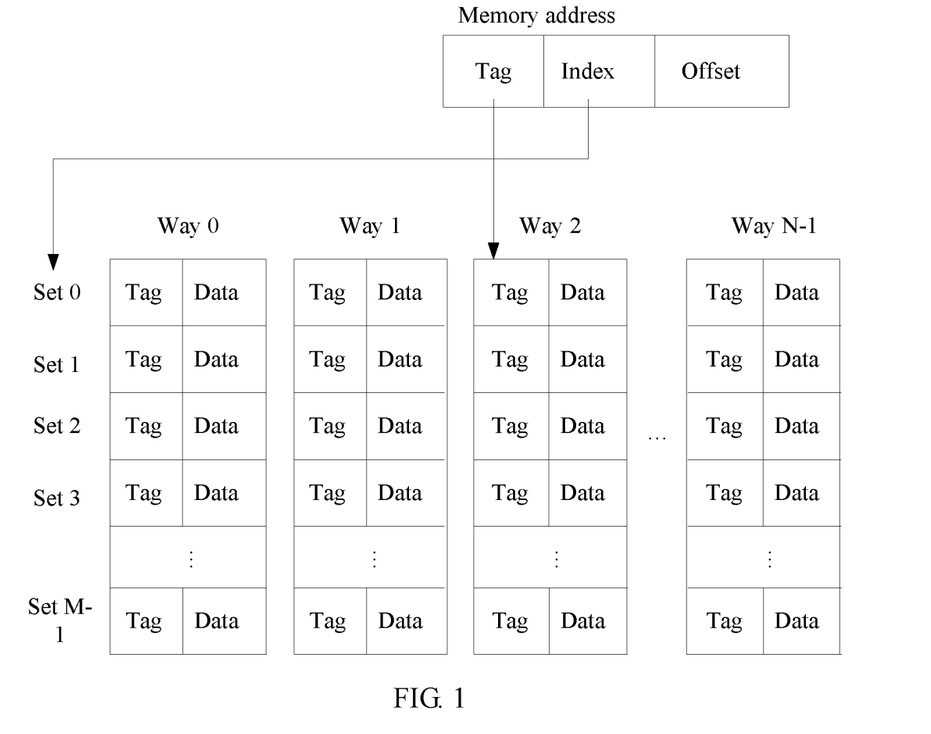
FIG. 1 is a structural diagram of a multi-way set associative memory according to an embodiment of the present application.

FIG. 1 is a structural diagram of a multi-way set associative memory. The multi-way set associative memory is usually used as a cache for a memory. The multi-way set associative memory usually includes M×N storage blocks. Each row of the storage blocks forms a storage set (Set0-SetM−1), each column of the storage blocks forms a storage way (Way0-WayN−1), each storage set is provided with a set identifier, for example, Set0-SetM−1, and M or N is a positive integer greater than or equal to 2.

Each storage block includes a data block and data block identification information. The data block is data stored in a storage block. The data block identification information is a tag of a data block and is used to indicate a memory address of the data block. That is, a location of the data block in the memory may be found by using the tag. Because an address of each data block in the memory is unique, the tag may uniquely identify the data block.

A memory access request includes a memory address of a to-be-accessed data block. The memory address usually includes a tag, an index, and an offset of the to-be-accessed data block. During data access, first, a storage set to which the to-be-accessed data block belongs is found by using the index. Then, all storage ways of the multi-way set associative memory are enabled. Then, the tag in the access request is matched with N tags in the found storage set. If a match is found, requested data is obtained, according to the offset Offset, from a data block corresponding to a matched tag, that is, an access hit. If no match is found, that is, an access miss, the data block to be accessed for the current access needs to be fetched from the memory.

During a data access process, even if no data is hit for the current access, all the storage ways of the multi-way set associative memory need to be enabled. Then the tag of the to-be-accessed data block in the access request is compared with tags of all data blocks in a storage set corresponding to the access request. In this case, redundant access is caused. Even if a match is found, because there may be only one matched data block, all the storage ways need to be enabled. In addition, if there are N storage ways, matching needs to be performed for N times. This causes N−1 times of redundant access.

Moreover, if the multi-way set associative memory is used by multiple threads, and a storage set accessed by a current thread is already occupied by another thread, the current thread still needs to enable all the storage ways and perform tag matching for a data block, to determine whether the accessed storage set has a data block that needs to be accessed this time. When the accessed storage set does not have the data block that needs to be accessed this time, the current thread needs to replace a data block of the another thread, and fetch, from the memory, the data block that needs to be accessed this time. However, when the another thread accesses the data block again, a same operation needs to be performed. In this case, more severe redundant access is caused.

The embodiments of the present application provide a redundancy elimination unit. The redundancy elimination unit records a tag of each data block of each storage set in a multi-way set associative memory. When there is a data access request, a tag, included in the access request, of a data block that needs to be accessed is compared with a tag, recorded in the redundancy elimination unit, of each data block in a target storage set. If no match is found, it indicates that the target storage set requested for the current access does not have the data block that needs to be accessed. In this way, not all storage ways of the multi-way set associative memory need to be enabled for comparison on data block tags. Therefore, redundant access is effectively reduced, and access performance of the memory is improved. Moreover, electric energy consumption caused by the redundant access is reduced.

The following describes how to reduce redundant access to the multi-way set associative memory in FIG. 1 with reference to specific embodiments.

Figure 2:
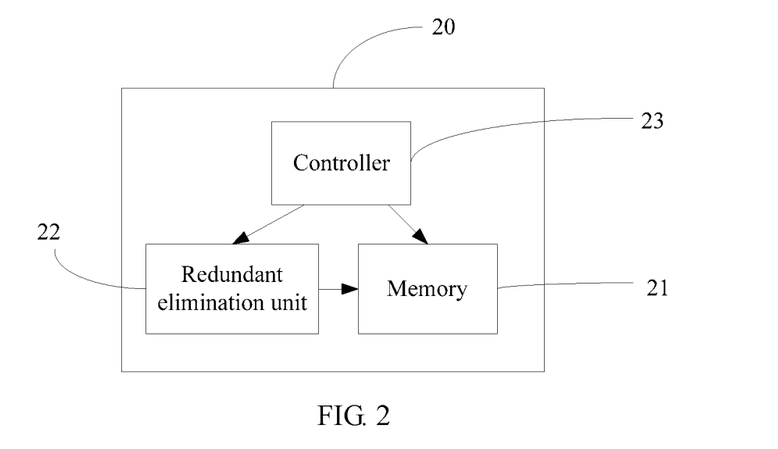
FIG. 2 is an architectural diagram of a memory access system according to an embodiment of the present application.

FIG. 2 is an architectural diagram of a memory access system according to an embodiment of the present application. The memory access system 20 includes a multi-way set associative memory 21 shown in FIG. 1, a redundancy elimination unit 22, and a controller 23.

Figure 3:
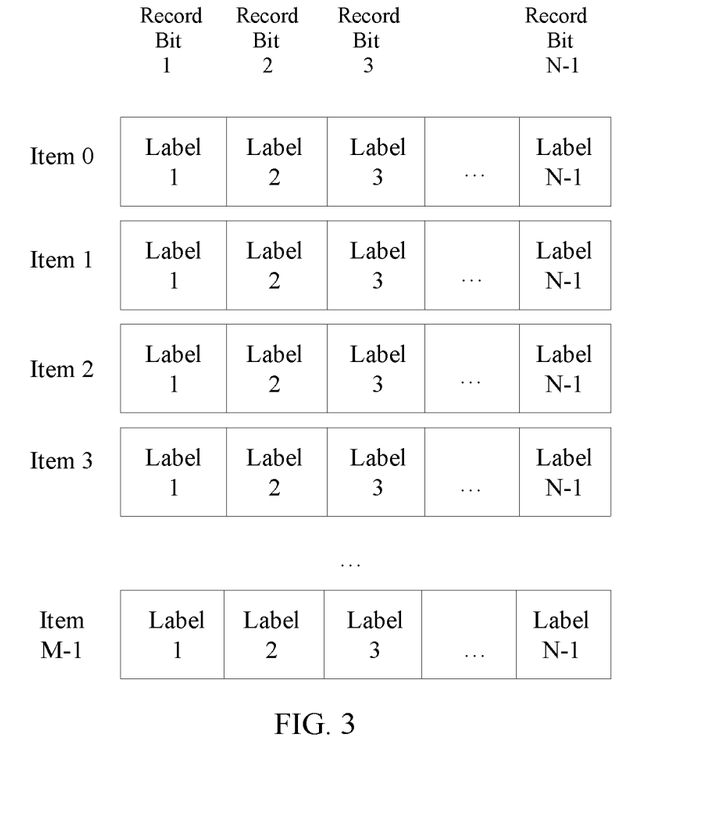
FIG. 3 is a schematic diagram of a redundancy elimination unit in the memory access system shown in FIG. 2.

As shown in FIG. 3, the redundancy elimination unit 22 records M record items (Item0-ItemM−1). Each record item corresponds to one of storage sets, and each record item includes N record bits. Each record bit corresponds to one storage block in one of the storage sets, and is used to store a tag of a stored data block in a corresponding storage block. The tag of the data block includes identification information of the data block, thread information, or a combination of identification information of the data block and thread information.

Figure 4:
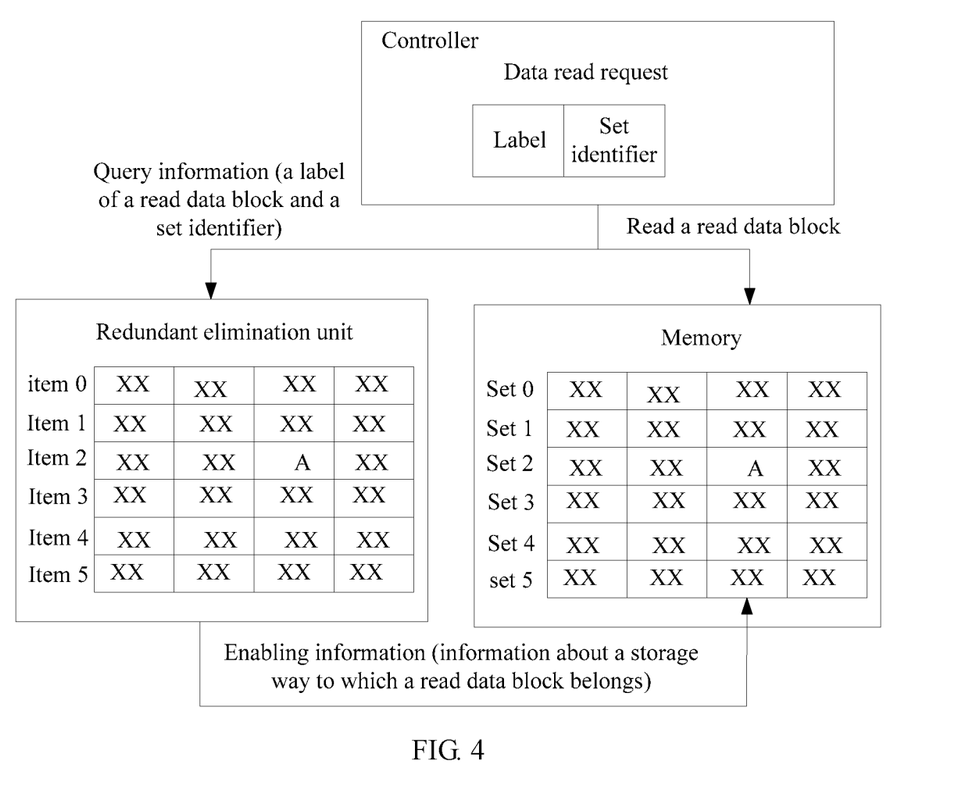
FIG. 4 is a schematic diagram of processing a data read request by the memory access system shown in FIG. 2.

As shown in FIG. 4, the controller 23 is configured to receive a data read request, obtain, from the read request, a tag of a read data block and a set identifier of a target storage set of the read data block, and send a query message to the redundancy elimination unit 22, where the query message carries the set identifier of the target storage set of the read data block and the tag of the read data block.

The redundancy elimination unit 22 is configured to: determine, according to the set identifier of the target storage set of the read data block, a record item corresponding to the set identifier of the target storage set; and match the tag of the read data block with a tag of a stored data block in the record item corresponding to the target storage set of the read data block, and if no match is found, send, to the controller 23, a query response message indicating that read data is not hit. In this way, the controller 23 does not need to enable all storage ways of the memory 21 for comparison on tags of all data blocks in the target storage set, so that redundant access is effectively reduced.

In addition, after the tag of the read data block matches the tag of the stored data block in the record item corresponding to the target storage set of the read data block, the redundancy elimination unit 22 determines a storage way to which a storage block corresponding to a matched record bit belongs, and sends information about the determined storage way to the controller 23. The controller 23 enables, according to the information about the storage way, the storage way corresponding to the information about the storage way. In this way, the controller 23 does not need to enable all storage ways for comparison on data block tags, but only needs to enable the storage way to which the storage block corresponding to the matched record bit belongs, so that redundant access is reduced.

In this embodiment, the tag, recorded in the redundancy elimination unit 22, of the data block is a tag of each data block in the memory 21, or information TID of a thread occupying each data block, or a combination of a tag of each data block and information TID of a thread occupying each data block.

When the tag of the data block is the tag of each data block, the controller 23 sends a tag of the read data block in the data read request to the redundancy elimination unit 22 for matching. When no match is found, information indicating that no match is found is sent to the controller 23. In this way, the controller 23 does not need to obtain the data block from the memory 21. Alternatively, when a match is found, only the storage way to which the storage block corresponding to the matched record bit belongs needs to be enabled. Therefore, redundant access to the memory is eliminated.

When the memory 21 is applied to a multi-thread system, the data read request further includes reading thread information TID of the read data block, and the tag of the read data block is the thread information TID of the read data block. A record bit of each record item in the redundancy elimination unit 22 also records thread information TID of a stored data block in each storage set. When receiving the data read request, the controller 23 sends the thread information of the read data block in the data read request to the redundancy elimination unit 22 for matching, and when no match is found, information indicating that no match is found is sent to the controller 23. In this way, the controller 23 does not need to enable all storage ways of the memory 21 to determine whether the target storage set has the read data block. Alternatively, when a match is found, the redundancy elimination unit 22 determines a storage way to which a storage block corresponding to a matched record bit belongs, and then sends information about the storage way to the controller 23. The controller 23 enables the storage way corresponding to the information about the storage way.

It should be noted that because one thread may occupy multiple data blocks in the target storage set, there may be multiple matched record items in the redundant elimination unit 22. In this case, the controller 23 may still enable multiple storage ways; then, further compare, in the enabled storage ways, a tag of the read data block with tags of data blocks in the target storage set; and if no match is found, return information indicating that the read data block is not hit, or if a match is found, read data.

It may be learned from the foregoing description that, in the multi-thread system, when a redundant access elimination operation is performed by using thread information TID, because one thread may occupy multiple data blocks in the target storage set, redundant access elimination operations can only be reduced, and cannot be eliminated completely. To completely eliminate the redundant access operations in the multi-thread system, the tag of the data block may be a combination of thread information of the data block and identification information of the data block.

When the tag of the data block is the combination of the thread information of the data block and the identification information of the data block, the redundant access elimination operation of the redundancy elimination unit 22 is specifically: comparing, according to the set identifier of the target storage set of the read data block, a thread identifier of the read data block with thread information of the stored data block in the record item corresponding to the target storage set of the read data block; and if no match is found, sending, to the controller, a query response message indicating that read data is not hit; or if a match is found, matching the identification information of the read data block with a data block identifier of a matched and stored data block in the record item corresponding to the target storage set, and if no match is found, sending, to the controller 23, a query response message indicating that read data is not hit. In this way, the redundant access elimination operations in the multi-thread system can be completely eliminated.

Figure 5:
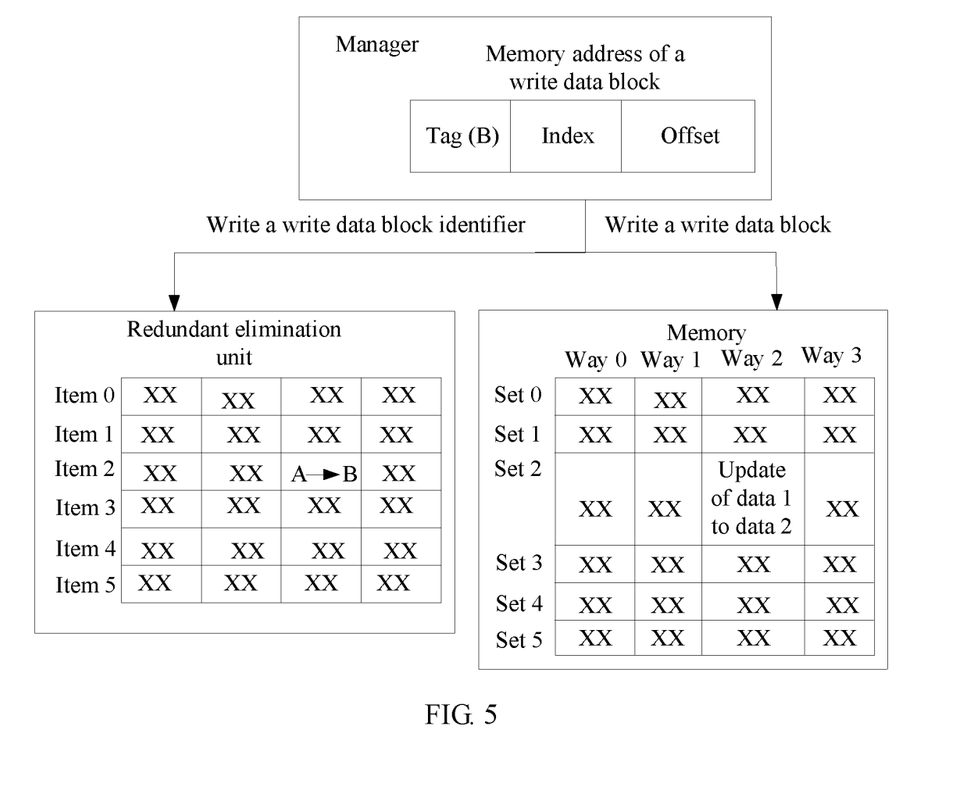
FIG. 5 is a schematic diagram of processing a data write request by the memory access system shown in FIG. 2.

As shown in FIG. 5, the controller 23 is further configured to receive a data write request, determine a target storage set of a write data block and a tag of the write data block, store the write data block to a target storage block in the target storage set, and send a set identifier of the target storage set of the write data block and the tag of the write data block to the redundancy elimination unit. The redundancy elimination unit 22 is further configured to: record, according to the set identifier of the target storage set of the write data block, the tag of the write data block into a record item corresponding to the set identifier of the target storage set of the write data block.

Moreover, the tag of the data block recorded in each record item of the redundancy elimination unit 22 changes with a data block stored in a storage block in the multi-way set associative memory. For example, when a data block that is in a storage block in a storage way 2 and that is in an item 2 corresponding to a storage set in the memory 21 is updated from data 1 to data 2, a tag stored in a record bit corresponding to the storage block is also changed from a tag A to a tag B in the redundancy elimination unit 22.

In another embodiment, the redundancy elimination unit 22 is not an independent hardware element, but is stored, as a data structure, in the memory 21, or is stored in a register that stores control instructions and that is in the controller 23. In this way, when receiving a data read request, the controller 23 determines a read data block and a target storage set of the read data block, queries the redundancy elimination unit according to a set identifier of the target storage set of the read data block, matches a tag of the read data block with a tag of a stored data block in a record item corresponding to the target storage set of the read data block, and if no match is found, returns information indicating that the read data block is not hit.

When receiving a data write request, the controller 23 determines a write data block and a target storage set of the write data block, stores the write data block to a target storage block in the target storage set, and records, according to a set identifier of the target storage set of the write data block, a tag of the write data block into a record item corresponding to the set identifier of the target storage set of the write data block.

Figure 6:
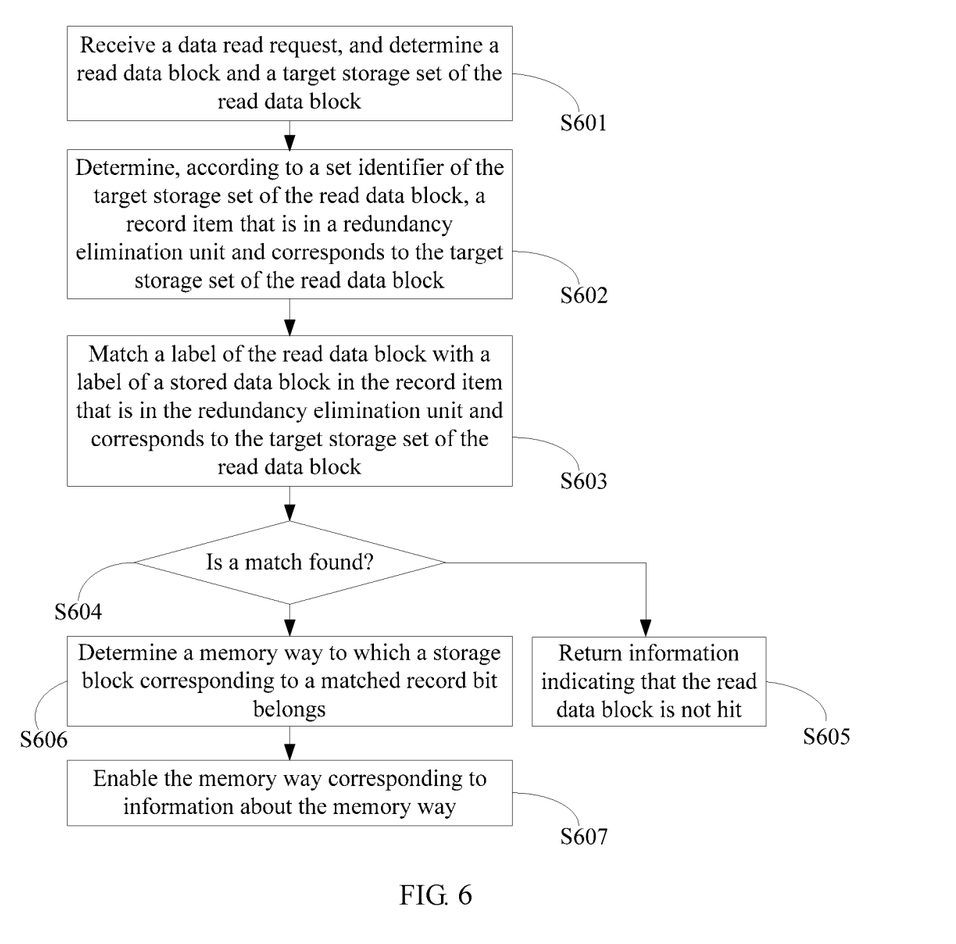
FIG. 6 is a flowchart of a memory access method according to an embodiment of the present application.

FIG. 6 is a flowchart of a memory access method according to an embodiment of the present application. The memory access method is applied to a memory access system. The memory access system includes a memory and a redundancy elimination unit. The memory includes M×N storage blocks, each row of the storage blocks forms a storage set, each column of the storage blocks forms a storage way, each storage set is provided with a set identifier, and M or N is a positive integer greater than or equal to 2. The redundancy elimination unit records M record items, each record item corresponds to one of the storage sets, and each record item is used to store a tag of a stored data block in one of the storage sets.

The memory access method includes:

Step S601: Receive a data read request, and determine a read data block and a target storage set of the read data block.

Step S602: Determine, according to a set identifier of the target storage set of the read data block, a record item that is in the redundancy elimination unit and corresponds to the target storage set of the read data block.

Step S603: Match a tag of the read data block with a tag of a stored data block in the record item that is in the redundancy elimination unit and corresponds to the target storage set of the read data block.

Step S604: Determine whether a match is found, and if no match is found, perform step S605, or if a match is found, perform step S606.

Step S605: Return information indicating that the read data block is not hit.

Step S606: If a match is found, determine a storage way to which a storage block corresponding to a matched record bit belongs.

Step S607: Enable the storage way corresponding to information about the storage way.

Figure 7:
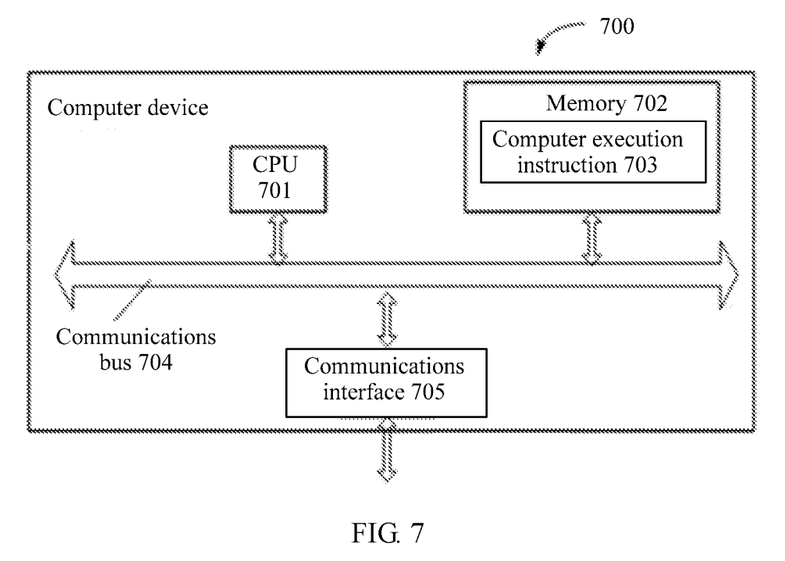
FIG. 7 is a schematic structural diagram of composition of a computer device according to an embodiment of the present application.

FIG. 7 is a schematic structural diagram of composition of a computer according to an embodiment of the present application. A computer in this embodiment of the present application may include:

a processor 701, a memory 702, a system bus 704, and a communications interface 705. The processor 701, the memory 702, and the communications interface 705 are connected to each other and communicate with each other by using the system bus 704.

The processor 701 may be a single-core or multi-core central processing unit, or an application-specific integrated circuit, or is one or more integrated circuits configured to implement the embodiments of the present application.

The memory 702 may be a high-speed RAM memory, or may be a non-volatile memory, for example, at least one magnetic disk storage.

The memory 702 is configured to store a computer-executable instruction 703. Specifically, the computer-executable instruction 703 may include program code.

When the computer runs, the processor 701 executes the computer-executable instruction 703, and may execute the method procedure shown in FIG. 6.

The embodiments of the present application further provide a computer readable medium, including a computer-executable instruction. When a processor of a computer executes the computer-executable instruction, the computer executes the method procedure shown in FIG. 6.

A person of ordinary skill in the art may understand that all or some of the steps of the methods in the foregoing embodiments may be implemented by a program instructing relevant hardware. The program may be stored in a computer readable memory medium. The memory medium may include: a ROM, a RAM, a magnetic disk, an optical disc, or the like.

The foregoing describes the data write apparatus and method in detail provided in the embodiments of the present application. Specific examples are used in this specification for expounding the principles and implementations of the present application. The description of the embodiments is merely intended to help understand the method of the present application and core ideas thereof. In addition, for a person of ordinary skill in the art, based on the ideas of the present application, modifications may be made to both the specific implementations and the application range. Based on the above, the content of this specification shall not be construed as a limitation to the present application.

What is claimed is:

1. A memory access system, comprising: a memory, a controller, and a redundancy elimination unit, wherein:
the memory comprises M×N storage blocks, wherein M rows of the storage blocks form M storage sets, N columns of the storage blocks form N storage ways, each storage set is provided with a set identifier, each storage block of the M×N storage blocks stores a data block and a tag identifying the data block, and at least one of M or N is a positive integer greater than or equal to 2;
the redundancy elimination unit is separate from the memory and is configured to record M record items, wherein each record item corresponds to one of the M storage sets, and each record item stores N tags corresponding to the N stored data blocks in one of the M storage sets;
the controller is configured to receive a data read request, determine a read data block and a target storage set of the read data block, and send a query message to the redundancy elimination unit, wherein the query message carries a set identifier of the target storage set of the read data block and a tag of the read data block; and
the redundancy elimination unit is further configured to determine an appropriate storage way in the memory to enable without accessing the memory, wherein determining comprises:
determining, according to the set identifier of the target storage set of the read data block and from among the M record items, a particular record item corresponding to the set identifier of the target storage set;
matching the tag of the read data block with a tag of a stored data block in the particular record item corresponding to the target storage set of the read data block;
in response to determining a match is found, determining the appropriate storage way to which a storage block corresponding to the matched tag belongs; and
in response to determining that no match is found, sending, to the controller, a query response message indicating that the read data block is not hit.

2. The system according to claim 1, wherein:
the controller is further configured to:
receive a data write request;
determine a write data block associated with the received data write request and a target storage set of the write data block;
store the write data block to a target storage block in the target storage set; and
send a set identifier of the target storage set of the write data block and a tag of the write data block to the redundancy elimination unit; and
the redundancy elimination unit is further configured to:
record, according to the set identifier of the target storage set of the write data block, the tag of the write data block into a record item corresponding to the set identifier of the target storage set of the write data block.

3. The system according to claim 2, wherein each record item in the redundancy elimination unit comprises N record bits, and each record bit corresponds to one storage block in one of the M storage sets; and
the redundancy elimination unit is further configured to record the tag of the stored data block into a corresponding record bit in a record item corresponding to a storage set to which the stored data block belongs.

4. The system according to claim 3, wherein:
the redundancy elimination unit is further configured to:
when the tag of the read data block matches the tag of the stored data block in the record item corresponding to the target storage set of the read data block, determine a storage way to which a storage block corresponding to a matched record bit belongs; and
send information about the determined storage way to the controller; and
the controller is further configured to:
enable, according to the information about the determined storage way, the storage way corresponding to the information about the determined storage way.

5. The system according to claim 1, wherein the tag of the data block comprises a thread identifier corresponding to at least one of the data block, identification information of the data block, and a combination of a thread identifier corresponding to the data block and an identification information of the data block.

6. The system according to claim 1, wherein when the tag of the data block comprises a thread identifier corresponding to the data block and identification information of the data block, the redundancy elimination unit is configured to:
   after receiving the query message, compare, according to the set identifier of the target storage set of the read data block, a thread identifier of the read data block with thread information of the stored data block in the record item corresponding to the target storage set of the read data block; and
   in response to the thread identifier of the read data block matching the thread information of the stored data block in the record item corresponding to the target storage set of the read data block, match identification information of the read data block with a data block identifier of a matched and stored data block in the record item corresponding to the target storage set of the read data block; and
   in response to the thread identifier of the read data block not matching the thread information of the stored data block in the record item corresponding to the target storage set of the read data block, send, to the controller, a query response message indicating that read data is not hit.

7. A memory access system, comprising: a memory, a controller, and a redundancy elimination unit, wherein:
   the memory comprises M×N storage blocks, wherein M rows of the storage blocks form M storage sets, N columns of the storage blocks form N storage ways, each storage set is provided with a set identifier, each storage block of the M×N storage blocks stores a data block and a tag identifying the data block, and M or N is a positive integer greater than or equal to 2;
   the redundancy elimination unit is separate from the memory and is configured to record M record items, wherein each record item corresponds to one of the M storage sets, and each record item stores N tags corresponding to the N stored data blocks in one of the M storage sets; and
   the controller is configured to:
      receive a data read request, determine a read data block and a target storage set of the read data block, query the redundancy elimination unit according to a set identifier of the target storage set of the read data block;
      match, without accessing the memory, a tag of the read data block with a tag of a stored data block in a record item corresponding to the target storage set of the read data block;
      in response to determining that a match is found, determine, without accessing the memory, an appropriate storage way to which a storage block corresponding to the matched tag belongs; and
      in response to determining that no match is found, return information indicating that the read data block is not hit.

8. The system according to claim 7, wherein:
   the controller is further configured to:
      receive a data write request;
      determine a write data block associated with the received data write request and a target storage set of the write data block;
      store the write data block to a target storage block in the target storage set; and
      record, according to a set identifier of the target storage set of the write data block, a tag of the write data block into a record item corresponding to the set identifier of the target storage set of the write data block.

9. The system according to claim 8, wherein each record item in the redundancy elimination unit comprises N record bits, and each record bit corresponds to one storage block in one of the M storage sets; and
   the controller is further configured to record a tag of the stored data block into a corresponding record bit in a record item corresponding to a storage set to which the stored data block belongs.

10. The system according to claim 9, wherein the controller is further configured to:
    in response to the tag of the read data block matching the tag of the stored data block in the record item corresponding to the target storage set of the read data block:
       determine a storage way to which a storage block corresponding to a matched record bit belongs; and
       enable the determined storage way.

11. The system according to claim 7, wherein the tag of the data block comprises at least one of a thread identifier corresponding to the data block, identification information of the data block, and a combination of a thread identifier corresponding to the data block and an identification information of the data block.

12. The system according to claim 7, wherein when the tag of the data block comprises a thread identifier corresponding to the data block and identification information of the data block, the controller is configured to:
    after a query message is received, the query message carrying a set identifier of the target storage set of the read data block and a tag of the read data block, compare, according to the set identifier of the target storage set of the read data block, a thread identifier of the read data block with thread information of the stored data block in the record item corresponding to the target storage set of the read data block;
    in response to the thread identifier of the read data block matching the thread information of the stored data block in the record item corresponding to the target storage set of the read data block, match identification information of the read data block with a data block identifier of a matched and stored data block in the record item corresponding to the target storage set; and
    in response to the thread identifier of the read data block not matching the thread information of the stored data block in the record item corresponding to the target storage set of the read data block, return information indicating that the read data block is not hit.

13. A memory access method, applied to a memory access system, wherein the memory access system comprises a memory and a redundancy elimination unit, the memory comprises M×N storage blocks, M rows of the storage blocks form M storage sets, N columns of the storage blocks form N storage ways, each storage set is provided with a set identifier, each storage block in the M×N storage blocks stores a data block and a tag indicating a memory address of the stored data block, and M or N is a positive integer greater than or equal to 2, and wherein the redundancy elimination unit is separate from the memory and records M record items, each record item corresponds to one of the M storage sets, and each record item stores N tags corresponding to the N stored data blocks in one of the M storage sets, the method comprising:
- receiving a data read request;
- determining a read data block associated with the data read request and a target storage set of the read data block;
- querying the redundancy elimination unit according to a set identifier of the target storage set of the read data block; and
- determining, by the redundancy elimination unit, an appropriate storage way in the memory to enable without accessing the memory, comprising:
  - matching a tag of the read data block with a tag of a stored data block in a record item recorded in the redundancy elimination unit and corresponding to the target storage set of the read data block;
  - in response to a match being found, determining the appropriate storage way to which a storage block corresponding to the matched tag belongs; and
  - in response to no match being found, returning information indicating that the read data block is not hit.

14. The method according to claim 13, further comprising:
- receiving a data write request;
- determining a write data block associated with the data write request and a target storage set of the write data block;
- storing the write data block to a target storage block in the target storage set; and
- recording, according to a set identifier of the target storage set of the write data block, a tag of the write data block into a record item corresponding to the set identifier of the target storage set of the write data block.

15. The method according to claim 14, wherein each record item in the redundancy elimination unit comprises N record bits, and each record bit corresponds to one storage block in one of the M storage sets, the method further comprising:
- recording a tag of the stored data block into a corresponding record bit in a record item corresponding to a storage set to which the stored data block belongs.

16. The method according to claim 15, wherein the method further comprises: when the tag of the read data block matches the tag of the stored data block in the record item corresponding to the target storage set of the read data block:
- determining a storage way to which a storage block corresponding to a matched record bit belongs; and
- enabling the determined storage way.

17. The method according to claim 13, wherein the tag of the data block comprises at least one of a thread identifier corresponding to the data block, identification information of the data block, and a combination of a thread identifier corresponding to the data block and an identifier of the data block.

18. The method according to claim 13, wherein when the tag of the data block comprises a thread identifier corresponding to the data block and identification information of the data block, and wherein, after query message is received, wherein the query message carries a set identifier of the target storage set of the read data block and a tag of the read data block, the method comprises:
- comparing, according to the set identifier of the target storage set of the read data block, a thread identifier of the read data block with thread information of the stored data block in the record item corresponding to the target storage set of the read data block;
- in response to the thread identifier of the read data block matching the thread information of the stored data block in the record item corresponding to the target storage set of the read data block, matching identification information of the read data block with a data block identifier of a matched and stored data block in the record item corresponding to the target storage set; and
- in response to the thread identifier of the read data block not matching the thread information of the stored data block in the record item corresponding to the target storage set of the read data block, returning information indicating that the read data block is not hit.

19. A computer device, comprising: at least one processor, a first memory, a bus, a communications interface, and a second memory, wherein the second memory comprises M×N storage blocks, M rows of the storage blocks form M storage sets, N columns of the storage blocks form N storage ways, each storage set is provided with a set identifier, each storage block in the M×N storage blocks stores a data block and a tag indicating a memory address of the stored data block, and M or N is a positive integer greater than or equal to 2;
- the first memory is configured to store a computer-executable instruction;
- the at least one processor is connected to the first memory by using the bus; and wherein the computer-executable instruction instructs the computer device to perform the following operations when executed:
  - receiving a data read request;
  - determining a read data block and a target storage set of the read data block;
  - querying a redundancy elimination unit according to a set identifier of the target storage set of the read data block, wherein the redundancy elimination unit is separate from the first memory and records M record items, each record item corresponds to one of the M storage sets, and each record item stores tags corresponding to the Nstored data blocks in one of the M storage sets; and
  - determining, by the redundancy elimination unit, an appropriate storage way in the memory to enable without accessing the memory, wherein determining comprises:
    - matching a tag of the read data block with a tag of a stored data block in a record item recorded in the redundancy elimination unit and corresponding to the target storage set of the read data block;
    - in response to a match being found, determining the appropriate storage way to which a storage block corresponding to the matched tag belongs; and
    - in response to no match being found, returning information indicating that the read data block is not hit.

* * * * *

UNITED STATES PATENT AND TRADEMARK OFFICE
CERTIFICATE OF CORRECTION

PATENT NO. : 10,901,640 B2
APPLICATION NO. : 15/827746
DATED : January 26, 2021
INVENTOR(S) : Fenglong Song, Guangfei Zhang and Tao Wang Page 1 of 1

It is certified that error appears in the above-identified patent and that said Letters Patent is hereby corrected as shown below:

In the Claims

In Column 16, Line 46, in Claim 19, delete "Nstored" and insert -- N stored --, therefor.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*